(12) United States Patent
Ochi

(10) Patent No.: US 10,245,960 B2
(45) Date of Patent: Apr. 2, 2019

(54) ELECTRIC POWER CONVERTER DEVICE

(71) Applicant: DENSO International America, Inc., Southfield, MI (US)

(72) Inventor: Kenji Ochi, Kariya (JP)

(73) Assignee: DENSO International America, Inc., Southfield, MI (US)

( * ) Notice: Subject to any disclaimer, the term of this patent is extended or adjusted under 35 U.S.C. 154(b) by 399 days.

(21) Appl. No.: 15/072,750

(22) Filed: Mar. 17, 2016

(65) Prior Publication Data
US 2017/0267111 A1  Sep. 21, 2017

(51) Int. Cl.
*H02J 7/00* (2006.01)
*B60L 11/18* (2006.01)
*H02M 3/158* (2006.01)
*H02J 50/10* (2016.01)
*H02M 1/00* (2006.01)

(52) U.S. Cl.
CPC ......... *B60L 11/1811* (2013.01); *B60L 11/182* (2013.01); *H02J 50/10* (2016.02); *H02M 3/158* (2013.01); *H02M 3/1582* (2013.01); *H02M 2001/007* (2013.01)

(58) Field of Classification Search
CPC .. H02J 50/12; H02J 7/025; H02J 50/90; H02J 50/80; H02J 50/60; H02J 50/70; H02J 50/50; H02J 5/005; H02J 17/00; H02J 9/02; H02J 7/34; H02J 7/345; H02J 9/065; H02J 9/061; H02J 50/05

USPC ................................................... 320/106–115
See application file for complete search history.

(56) References Cited

U.S. PATENT DOCUMENTS

| | | | |
|---|---|---|---|
| 2013/0020989 A1* | 1/2013 | Xia ...................... | H02M 7/2176 320/109 |
| 2013/0320911 A1* | 12/2013 | Kamiya .................. | H02J 7/025 320/101 |
| 2014/0265615 A1 | 9/2014 | Kim et al. | |
| 2014/0321169 A1 | 10/2014 | Mueller et al. | |
| 2015/0097527 A1* | 4/2015 | DeDona .............. | B60L 11/1818 320/109 |

* cited by examiner

*Primary Examiner* — Binh Tat
(74) *Attorney, Agent, or Firm* — Harness, Dickey & Pierce, P.L.C.

(57) ABSTRACT

An electric power converter device for charging a battery in a vehicle may include a power factor converter, a DC-to-DC converter, and a bypass switch. The power factor converter receives a DC power from a power source and increases a voltage level of the DC power. The DC-to-DC converter is operable to decrease the voltage of the DC power from the power factor converter. The bypass switch is operable to electrically couple a power output device to one of the power factor converter or the DC-to-DC converter such that the electrical power provided by the power output device to the battery is based on one of a voltage output of the power factor converter or a voltage output of the DC-to-DC converter.

16 Claims, 3 Drawing Sheets

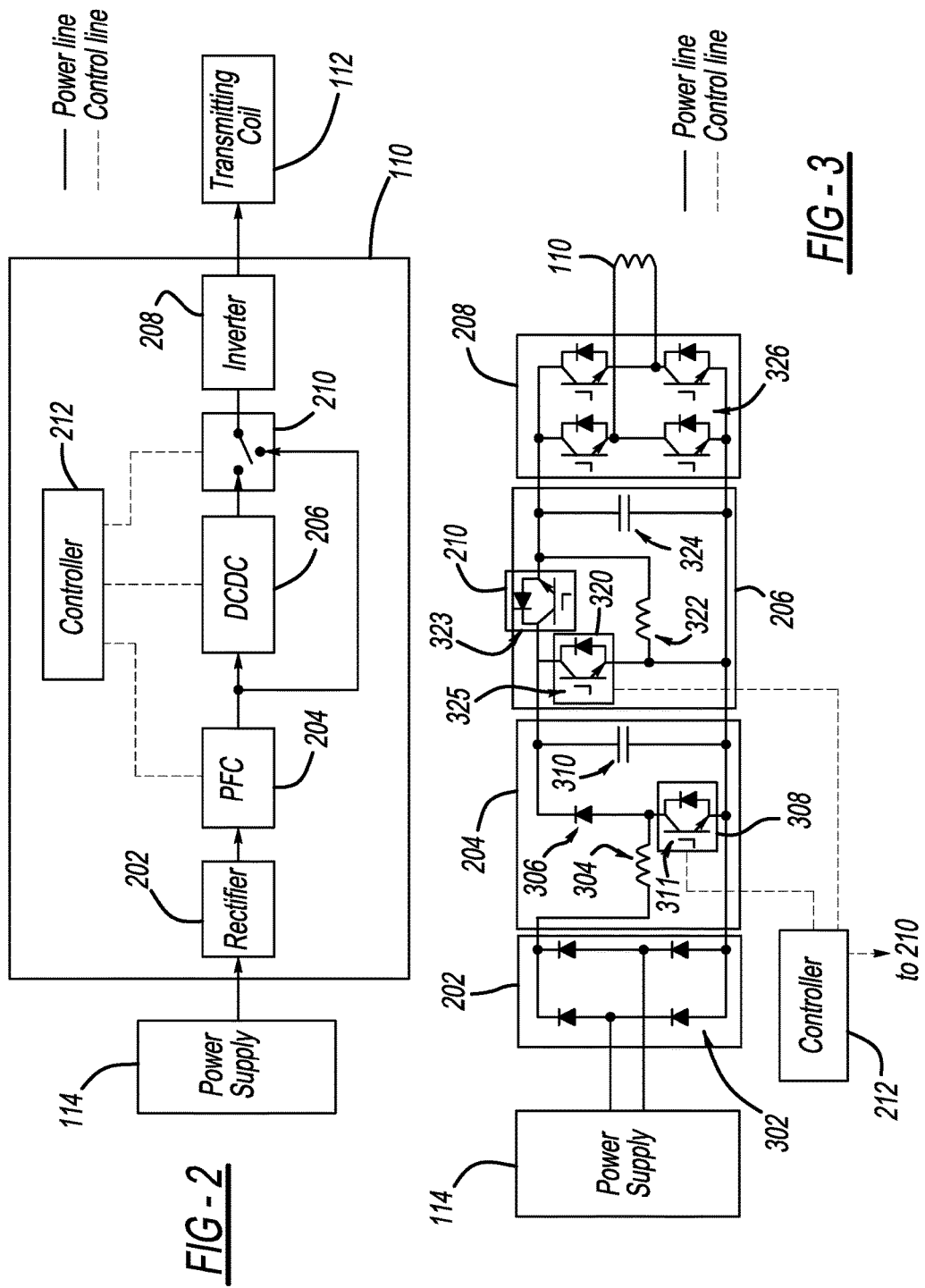

ELECTRIC POWER CONVERTER DEVICE

FIELD

The present disclosure relates to a power converter device, and more particularly, to a power converter device for converting electric voltage during a charge operation for a battery in a vehicle.

BACKGROUND

This section provides background information related to the present disclosure which is not necessarily prior art.

Electric vehicles (EV) and/or plug-in hybrid vehicles (PHEV) include battery systems that provide power to a motor that drives the vehicle. The battery systems of the vehicle may be charged by electrical power from an electrical grid. For example, the battery system may be connected to the electrical grid using a copper cable. One end of the copper cable may be coupled to the electrical grid by way of a power converter and the other end of the copper cable may have a plug that interfaces with a power outlet on the vehicle.

The battery system may also connect to the electrical grid by implementing a wireless or contactless charging system. A wireless charging system may utilize the mutual inductance between two inductive coils to provide power to the battery system. For example, power from an electrical grid may be provided to a first coil by way of a power converter and, as a result of the inductive coupling between the first coil and a second coil connected to the battery system, the second coil will induce a voltage and subsequently charge the battery system of the HEV or EV.

For both wired and wireless charging systems, a power converter or in other words, an electric power converter device, is used to convert the electric power from the electrical grid to a desired voltage level for the battery system of the vehicle. The electric power converter device may increase the voltage from the electric grid to a desired level and supply either an alternating current or a direct current to the battery system of the vehicle. The battery system of the vehicle may also include a power converter than may convert the electric power from the electric power converter device to a desired direct current that is applied to the battery.

The desired voltage level provided by the electric power converter device may be determined based on various factors. For example, the desired voltage level may be based on the state of charge of the battery system, a quick-charge operation of the battery, an alignment between the two inductive coils for a wireless charging system, and/or other suitable factors. During certain situations, such as a quick-charge operation of the battery or a misalignment between two inductive coils, additional power may be required to charge the battery. Accordingly, an electric power converter device may be required to supply a higher voltage level than what is typically required during a standard charge operation.

SUMMARY

This section provides a general summary of the disclosure, and is not a comprehensive disclosure of its full scope or all of its features.

The present disclosure is generally directed toward an electric power converter device for charging a battery in a vehicle via a wireless charging system or a wired charge system. The electric power converter device may include a power factor converter, a DC-to-DC converter, a power output device, and a bypass switch.

The power factor converter may receive a direct current (DC) power from a power source, and increase a voltage level of the DC power. The DC-to-DC converter may be electrically coupled to the power factor converter and is operable to decrease the voltage of the DC power from the power factor converter. Accordingly the power factor converter and the DC-to-DC converter may form a two stage DC power converter.

The bypass switch is operable to electrically couple the power output device to one of the power factor converter or the DC-to-DC converter. In particular, the power output device is configured to provide electrical power to the battery in the vehicle. Based on the state of the bypass switch, the electrical power provided by the power output device to the battery is based on one of a voltage output of the power factor converter or a voltage output of the DC-to-DC converter. Accordingly, with the bypass switch, the electric power converter device is able to provide a standard voltage output via the DC-to-DC converter to the battery or is able to bypass the DC-to-DC converter and provide a higher voltage level to the power output device via the power factor converter.

Further areas of applicability will become apparent from the description provided herein. The description and specific examples in this summary are intended for purposes of illustration only, and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a functional block diagram of the wireless charging system that includes an electric power converter device of the present disclosure;

FIG. 3 is an example circuit diagram of a transmitting network side of the wireless charging system.

Corresponding reference numerals indicate corresponding parts throughout the several views of the drawings.

DETAILED DESCRIPTION

The present disclosure will now be described with reference to the accompanying drawings.

Figure 1:
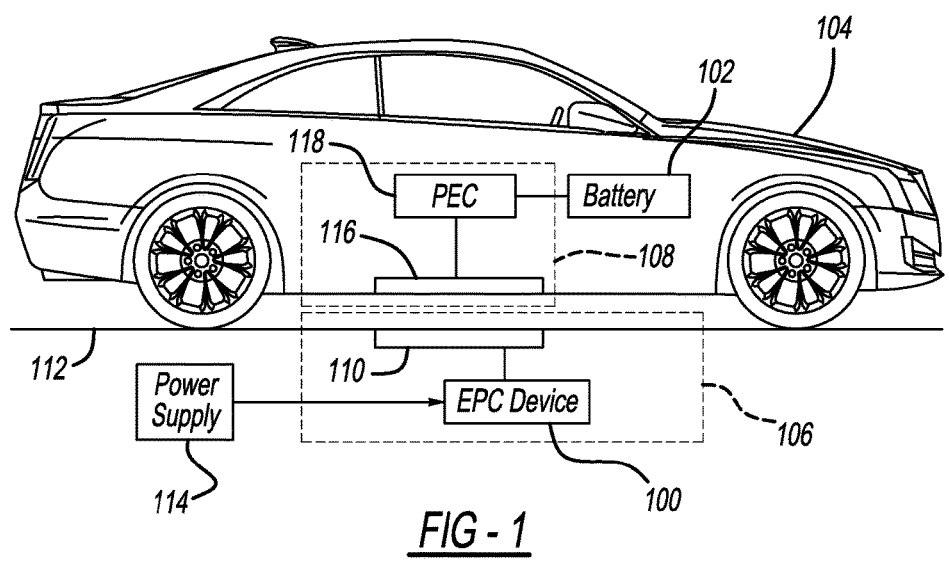
FIG. 1 illustrates a wireless charging system for charging a battery in a vehicle.

With reference to FIG. 1, in an example embodiment, an electric power converter (EPC) device 100 is provided as part of a wireless charging system for charging a battery 102 in a vehicle 104. The wireless charging system utilizes two inductive coils that are part of a transmitting side network 106 and a receiving side network 108. The transmitting side network 106 includes the EPC device 100 and a transmitting coil 110 (i.e., one of the two inductive coils). The transmitting coil 110 may be positioned along a surface 112 upon which the vehicle 104 is standing. The EPC device 100 is connected to a power supply 114 that supplies a single phase or a three-phase alternating current from an electrical power grid. The EPC device 100 converts the electrical power from the power supply 114 to an alternating current having a desired frequency, and voltage and supplies the alternating current to the transmitting coil 110.

The receiving side network 108 is provided in the vehicle 104 and is electrically coupled to the battery 102. The receiving side network 108 includes a receiving coil 116 and a power electronics circuit (PEC) 118. The receiving coil 116 is positioned along an underside of the vehicle 104 and is configured to face the transmitting coil 110. As power is supplied to the transmitting coil 110, the transmitting coil 110 induces an alternating current in the receiving coil 116. The PEC 118 converts the electrical power received by the receiving coil 116 to direct current that is supplied to the battery 102.

The amount of power supplied to the receiving side network 108 is determined based on various factors, such as the state of charge of the battery 102, the charge capacity of the battery 102, the type of charge operation (e.g., quick charge or normal charge), and/or the alignment of the transmitting coil 110 and the receiving coil 116. Accordingly, the amount of power being transmitted from the transmitting side network 106 and the receiving side network 108 may vary.

With reference to FIGS. 2 and 3, in an example embodiment, the EPC device 100 may include a rectifier 202 (i.e., AC-to-DC power converter), a power factor converter (PFC) 204, a DC-to-DC (DCDC) converter 206, an inverter 208, a bypass switch 210, and a controller 212. The rectifier 202 is electrically coupled to the power supply 114 and converts the alternating current from the power supply 114 to a direct current that is supplied to the PFC 204. The rectifier 202 may be a bridge rectifier 302 having four diodes that output direct current having a first voltage level (e.g., 300V) to the PFC 204.

The PFC 204 is a boost converter and is electrically coupled to the DCDC converter 206 and to the bypass switch 210. As a boost converter, the PFC 204 may increase the voltage of the electric power from the rectifier 202 to a second voltage level that is between a lower threshold and an upper threshold. As an example, the PFC 204 may output a voltage between 300V and 400V.

In the example embodiment, the PFC 204 includes an inductor 304, a diode 306, a switch 308, and a capacitor 310. The inductor 304 and the diode 306 are connected in series with the rectifier 202, and the capacitor 310 is positioned in parallel with the rectifier 202.

The switch 308 is provided as a transistor 311 that is operable in an ON-state and OFF-state by the controller 212, as described in detail below. When the transistor 311 is in an ON-state (i.e., a voltage is applied to the transistor 311), the switch 308 is essentially closed and current flowing through the inductor 304 increases and charges the inductor 304. In addition, the capacitor 310 begins to discharge and supplies power to the DCDC converter 206. When the transistor 311 is in an OFF-state (i.e., no voltage is applied to the transistor 311), the switch 308 is essentially open and current flows through the inductor 304, the diode 306, and the capacitor 310, thereby discharging the inductor 304 and charging the capacitor 310. The transistor 311 is provided as an insulated-gate bipolar transistor (IGBT) with an anti-parallel diode; however, other suitable transistors may be used. The switch 308 may also be referred to as a PFC mode selection switch 308.

The DCDC converter 206 may be a buck converter that decreases the voltage output of the PFC 204 to a voltage level between a predetermined range, such as between 0-350V. The DCDC converter 206 may include a switch 320, an inductor 322, and a capacitor 324. The switch 320, the inductor 322, and the capacitor 324 are connected in series. The capacitor 324 is connected in parallel with the inverter 208 and the capacitor 310 of the PFC 204.

The switch 320 may be a transistor 325 that is operable in an ON-state and an OFF-state by the controller 212. The switch 320 controls the flow of current through the inductor 322. For example, when the transistor 325 is in the ON-state (i.e., a voltage is applied to the transistor 325), the switch 320 is in a closed state and allows current to flow through the inductor 322, thereby increasing the voltage across the inductor 322. When the transistor is in the OFF-state (i.e., no voltage is applied to the transistor 325), the switch 320 is in an open state and no current flows through the inductor 322 and the capacitor 324. The switch 320 may also be referred to as a DCDC switch.

The bypass switch 210 controls the voltage applied to the inverter 208. Specifically, the bypass switch 210 is operable by the controller 212 to either electrically couple the output of the PFC 204 to the inverter 208 or the output of the DCDC converter 206 to the inverter 208. As illustrated in FIG. 3, the bypass switch 210 is provided as a transistor 323 positioned at the DCDC converter 206 between the capacitor 310 of the PFC 204 and the capacitor 324 of the DCDC converter 206. When the controller 212 applies a voltage to the bypass switch 210, the bypass switch 210 is in a closed state and the PFC 204 is electrically coupled to the inverter 208. Accordingly, the high-voltage output of the PFC 204 is applied to the inverter 208. Alternatively, when no voltage is applied to the bypass switch 210, the bypass switch 210 is in an open state and the DCDC converter 206 is electrically coupled to the inverter 208. While the bypass switch 210 is illustrated as being positioned with the DCDC converter 206, the bypass switch 210 may be arranged in other suitable manners, and is not limited to the configuration depicted herein.

The inverter 208 converts the electrical power from the PFC 204 or the DCDC converter 206 to an alternating current that is supplied to the transmitting coil 110. The inverter 208 may be H-bridge inverter circuit 326 with four transistors.

The transmitting coil 110 receives the alternating current from the inverter 208 and forms a magnetic field that induces an alternating current in the receiving coil 116 provided in the vehicle. The alternating current from the receiving coil 116 flows to the PEC 118. The PEC 118 may include a rectifier that converts the alternating current to direct current that is supplied to the battery 102 of the vehicle 104 to charge the battery 102. The transmitting coil 110 and the receiving coil 116 may include a compensation circuit (not shown) to improve the efficiency of the wireless charging system.

While the wireless charging system has the advantage of not requiring cables, connectors, and plugs, the wireless charging system often has low power efficiency due to, for example, possible misalignment between the receiving coil and the transmitting coil. To compensate for the misalignment, the transmitting coil 110 may be supplied with additional voltage to increase the strength of the magnetic field between the transmitting coil 110 and the receiving coil 116.

The controller 212 of the EPC device 100 controls the electric power applied to the transmission coil 110 by way of the bypass switch 210, the PFC mode selection switch 308, and the DCDC switch 320. The amount of voltage needed to charge the battery 102 may be determined by, for example, the state of charge of the battery 102, the capacity of the battery 102, possible misalignment between the receiving coil 116 and the transmitting coil 110, and other suitable information regarding the battery 102 of the vehicle 104.

Misalignment between the receiving coil 116 and the transmitting coil 110 can be detected using various suitable methods. For example, the controller 212 may detect misalignment by comparing power being supplied to the transmitting coil 110 to power being received by the receiving coil 116. If the difference exceeds a certain threshold, then the receiving coil 116 and the transmitting coil 110 may be misaligned.

Information regarding the battery 102 of the vehicle 104, such as the power being received, the state of charge of the battery 102, the charge capacity, and/or charge operation type may be referred to as a power status of the battery 102, and is provided to the controller 212. For example, the controller 212 may exchange information with a control module (not shown) in the vehicle 104 via a wireless communication link, such as Bluetooth or WIFI. Alternatively, the controller 212 may exchange information via wired link that accesses the local area network of the vehicle 104. To communicate with the control module of the vehicle 104, the controller 212 may include, for example, an input/output interface, a transceiver, and/or other suitable device for performing wireless and/or wired communication.

Figure 4:
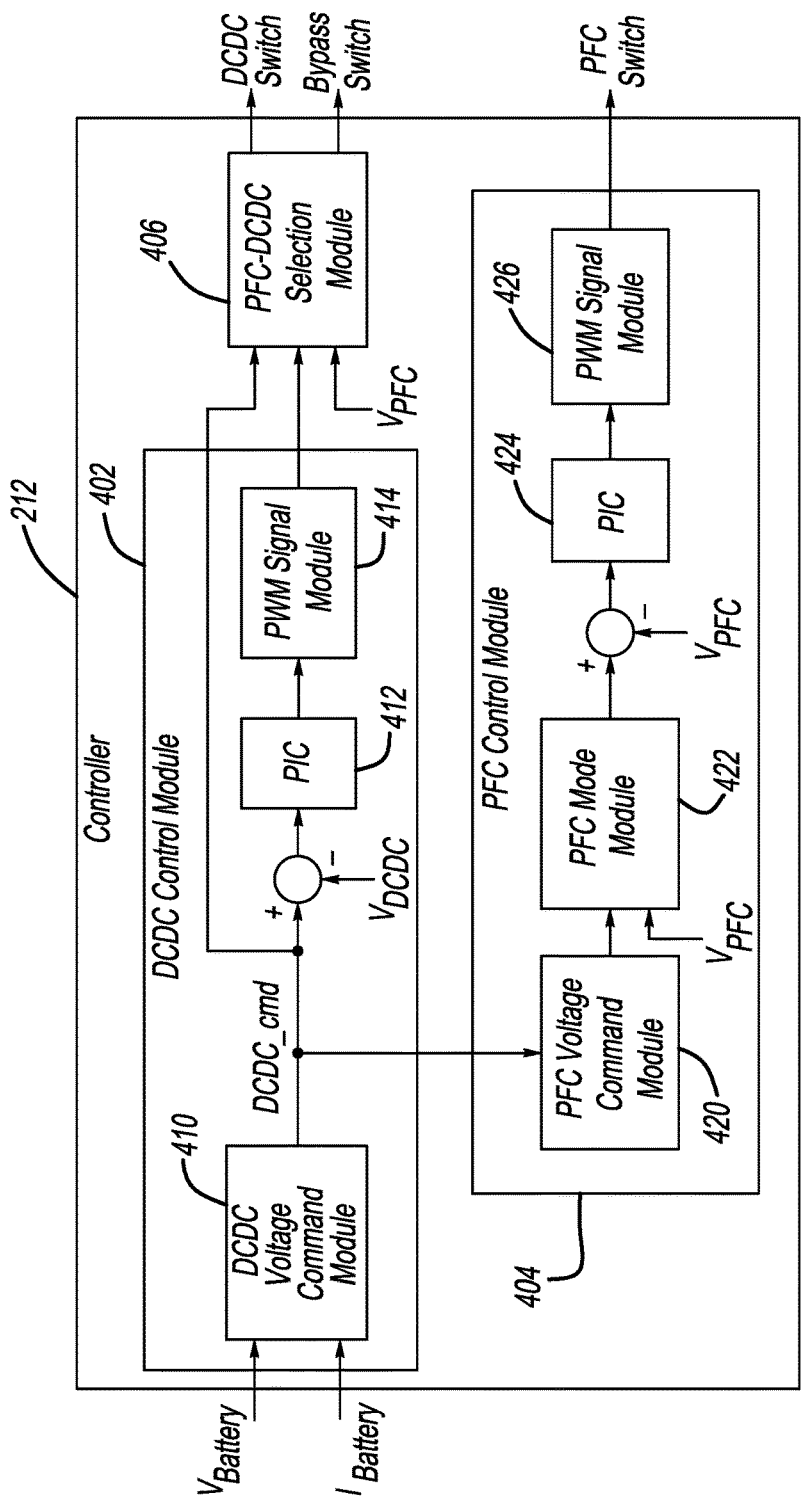
FIG. 4 is a functional block diagram of a controller of the electric power converter device.

With reference to FIG. 4, in an example embodiment, the controller 212 may include a DCDC control module 402, a PFC control module 404, and a PFC-DCDC selection module 406. The DCDC control module 402 determines a desired output voltage of the DCDC converter 206 (i.e., desired DCDC voltage), and generates a drive signal to be applied to the DCDC switch 320 for opening and closing the DCDC switch 320. The DCDC control module 402 includes a DCDC voltage command module 410, a proportional integral controller (PIC) 412, and a PWM signal module 414.

The DCDC voltage command module 410 generates a DCDC command signal (i.e., "DCDC_cmd" in the figures) that is indicative of the desired DCDC voltage to be outputted by the DCDC converter 206. The DCDC voltage command module 410 determines the desired DCDC voltage based on predefined algorithms stored and executed by the module 410 and the power status of the battery 102, such as a voltage level of the battery 102 (i.e., $V_{Battery}$) and/or an electric current output of the battery (i.e., $I_{Battery}$). As another example, the desired voltage may be predefined based on the power to be required and the current voltage of the battery.

The PIC 412 minimizes an error of the DCDC command based on at least the desired DCDC voltage and a current DCDC voltage (i.e., $V_{DCDC}$ in the figures) and outputs a corrected DCDC command signal. The current DCDC voltage is the voltage currently being outputted by the DCDC converter 206 and may be provided as the voltage across the capacitor 324. The current DCDC voltage may be detected by a sensor positioned within the EPC 100 device or may be based on the previous desired output voltage calculated by the module 410. The PWM signal module 414 performs a pulse width modulation (PWM) on the corrected DCDC command signal to generate a PWM drive signal to be applied to the switch 320 for generating the desired DCDC voltage.

The PFC control module 404 determines an operation mode of the PFC control module 404 and outputs a drive signal to the PFC mode selection switch 308 for controlling the PFC control module 404 based on the selected operation mode. Specifically, the drive signal applied to the switch 308 opens and closes the switch 308, such that the inductor 306 and the capacitor do not fully discharge. A duty cycle of the drive signal applied to the switch 308 may control the output voltage of the PFC 204. For example, the output voltage of the PFC 204 increases the longer the switch 308 is closed. Thus, the output voltage of the PFC 204 may be controlled to a desired voltage by adjusting the duty cycle of the switch 308.

In an example embodiment, the PFC 204 may be controlled in a normal mode or in a boost mode. In the normal mode, a first drive signal is applied to the switch 308 to have the PFC 204 output a steady voltage (i.e., a constant voltage). In the boost mode, a second drive signal different from the first drive signal is applied to the switch 308 to have the PFC 204 output a voltage that is dependent on an output voltage of the DCDC converter 206 (i.e., a variable voltage). For example, in the normal mode, the PFC 204 may output a constant voltage of about 380V and, in the boost mode, the PFC 204 may output a voltage between 380-400V.

The PFC control module 404 may include a PFC voltage command module 420, a PFC mode module 422, a PIC 424, and a PWM signal module 426. The PFC voltage command module 420 determines a desired output voltage of the PFC 204 (i.e., desired PFC voltage). In the example embodiment, the desired PFC voltage may be the steady voltage (i.e., a constant voltage) or the variable voltage that is based on the desired DCDC voltage. The steady voltage may be predefined and based on a working voltage range of the system. The PFC voltage command module 420 may provide a signal indicative of both desired PFC voltages (i.e., a steady voltage and a variable voltage) to the PFC module 422.

The PFC mode module 422 determines which mode the PFC 204 should be operated in and therefore, the output voltage of the PFC 204. For example, the PFC mode module 422 may compare the desired DCDC voltage with a current PFC voltage (i.e., $V_{PFC}$). The current PFC voltage is provided as the voltage currently being outputted by the PFC 204 and may be provided as the voltage across capacitor 310. The current PFC voltage may be detected by a sensor or other suitable method. If the current PFC voltage is greater than the desired DCDC voltage, the PFC mode module 422 outputs the first drive signal to control the PFC 204 in the normal mode and have the PFC 204 output a constant voltage. If the current PFC voltage is less than or equal to the desired DCDC voltage, the PFC mode module 422 outputs the second drive signal, which is based on the desired DCDC voltage, to control the PFC 204 in the boost mode and have the PFC 204 output a variable voltage.

From the PFC mode module 422, the PIC 424 minimizes an error of the drive signal based on at least the desired PFC voltage and the current PFC voltage, and outputs a corrected drive signal. The PWM signal module 426 modulates the corrected drive signal to generate a PWM drive signal to be applied to the PFC mode selection switch 308.

The PFC-DCDC selection module 406 determines whether to electrically couple the DCDC converter 206 or the PFC 204 to the inverter 208. More particularly, the selection module 406 controls the state of the DCDC switch 320 and the bypass switch 210 based on the desired DCDC voltage determined by the DCDC voltage command module 410 and the current PFC voltage of the PFC 204. For example, if the current output voltage of the PFC 204 is greater than or equal to the desired DCDC voltage, the selection module 406 electrically couples the inverter 208 to the DCDC converter 206 by maintaining the bypass switch 210 in the open state and applying the drive signal from the PWM signal module 414 to the DCDC switch 320. Alternatively, if the current output voltage of the PFC 204 is less than the desired DCDC voltage, the selection module 406 electrically couples the inverter 208 to the PFC 204 by closing the bypass switch 210 (i.e., driving the transistor 323) and not supplying the drive signal from the PWM signal module 414 to the DCDC switch 320.

Accordingly, the selection module 406 electrically couples the PFC 204 to the inverter 208 when the DCDC converter 206 is required to output more electrical power than what is currently being outputted by the PFC 204. On the other hand, when the DCDC converter 206 is required to output less electrical power than what is currently being outputted by the PFC 204, the selection module electrically couples the DCDC converter 206 to the inverter 208.

The controller 212 may operate the PFC mode selection switch 308, the DCDC switch 320, and the bypass switch 210 to output the required voltage for charging the battery 102. For instance, the controller 212 may close the DCDC switch 320, open the bypass switch 210, and control the PFC mode selection switch 308 in the normal mode in order to output a normal range of voltage to the transmitting coil 110. In this state, the bypass switch 210 electrically couples the DCDC converter 206 to the inverter 208, the PFC 204 is controlled to output a constant voltage, and the DCDC converter 206 decreases the voltage from the PFC 204 to a desired voltage. The controller 212 may output the normal range of voltage when, for example, the state of charge of the battery 102 is above a certain threshold, the receiving coil 116 and the transmitting coil 110 are sufficiently aligned, a normal charge operation is requested by the battery 102, and/or other suitable circumstances.

Alternatively, the controller 212 may control the EPC device 100 such that the DCDC switch 320 is open, the bypass switch 210 is closed, and the PFC switch 308 is operated in the boost mode to output a higher voltage than the normal range to the transmitting coil 110. In this state, the bypass switch 210 electrically couples the PFC 204 to the inverter 208 to bypass the DCDC converter 206 and the PFC 204 is controlled to output a variable voltage that is based on a desired DCDC voltage. The controller 212 may output the higher voltage when, for example, the state of charge of the battery is below a certain threshold, the receiving coil 116 and the transmitting coil 110 are not properly aligned, a quick-charge operation is requested by the battery 102, and/or other suitable circumstances.

In the example embodiment, the EPC device 100 is provided for a wireless charging system. Alternatively, the EPC device may be configured for a wired charging system. Specifically, a wired charging system may be configured to supply different voltages to the battery 102 based on, for example, a state of charge of the battery 102 and/or a charge request from the battery 102. For instance, if the state of charge of the battery 102 is below a specific value or if a quick charge of the battery 102 is requested, the wired charging system my supply a higher voltage level to the battery 102 to quickly charge the battery 102. The wired charging system may also supply a standard voltage level during normal charge operations of the battery, where the standard voltage level is less than the high voltage level.

Accordingly, an EPC device for a wired charging system may not include an inverter 208 and may include an isolated DC-to-DC converter that output DC power to the battery via a plug that connects with an interface of the vehicle 104. The inverter 208 and/or the isolated DC-to-DC converter may be referred to as a power output device of the EPC device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

What is claimed is:

1. An electric power converter device for charging a battery in a vehicle, the electric power converter device comprising:
   a power factor converter receiving a direct current DC power from a power source, wherein the power factor converter increases a voltage level of the DC power;
   a DC-to-DC converter electrically coupled to the power factor converter and operable to decrease the voltage of the DC power from the power factor converter;
   a power output device configured to provide electrical power to the battery in the vehicle;
   a bypass switch operable to electrically couple the power output device to one of the power factor converter or the DC-to-DC converter such that the electrical power provided by the power output device to the battery is based on one of a voltage output of the power factor converter or a voltage output of the DC-to-DC converter; and
   a controller configured to switch the bypass switch between a first state, whereby the bypass switch electrically couples the power output device to the DC-to-DC converter, and a second state, whereby the bypass switch electrically couples the power output device to the power factor converter.

2. The electric power converter device of claim 1 further comprising:
   an AC-to-DC power converter operable to convert alternating current from a power supply to direct current DC power, wherein the power factor converter is electrically coupled to the AC-to-DC power converter and the AC-to-DC power converter, as the power source, supplies the DC power to the power factor converter.

3. The electric power converter device of claim 1, wherein:
   the controller is configured to operate the bypass switch based on a current output voltage of the power factor converter and a desired output voltage of the DC-to-DC converter, wherein:
   when the current output voltage of the power factor converter is greater than the desired output voltage of the DC-to-DC converter, the controller operates the bypass switch in the first state to electrically couple the DC-to-DC converter to the power output device, and
   when the current output voltage of the power factor converter is less than the desired output voltage of the DC-to-DC converter, the controller operates the bypass switch in the second state to electrically couple the power factor converter to the power output device.

4. The electric power converter device of claim 1 wherein:
   the power factor converter is operable in a first mode and a second mode based on a desired output voltage of the DC-to-DC converter,
   in the first mode, the power factor converter outputs a constant voltage, and
   in the second mode, the power factor converter outputs a variable voltage dependent on the desired output voltage of the DC-to-DC converter.

5. The electric power converter device of claim 1 wherein:
   the power output device includes an inverter that is electrically coupled to a transmitting coil of a wireless power transfer system,
   the inverter supplies an alternating current that is based on one of the voltage output of the power factor converter or the voltage output of the DC-to-DC converter to the transmitting coil, and
   the transmitting coil induces a voltage in a receiving coil positioned in the vehicle in response to receiving the alternating current.

6. The electric power converter device of claim 5, wherein:
   the controller is configured to operate the bypass switch based on a current output voltage of the power factor converter and a desired output voltage of the DC-to-DC converter, wherein:
   in the event the transmitting coil and the receiving coil are aligned, the controller sets the desired output voltage of the DC-to-DC to a first desired output voltage,
   in the event the transmitting coil and the receiving coil are misaligned, the controller sets the desired output voltage of the DC-to-DC to a second desired output voltage that is greater than the first desired output voltage,
   the controller operates the bypass switch in the first state to electrically couple the DC-to-DC converter to the power output device when the desired output voltage of the DC-to-DC converter is set to the first desired output voltage, and
   the controller operates the bypass switch in the second state to electrically couple the power factor converter to the power output device when the desired output voltage of the DC-to-DC converter is set to the second desired output voltage.

7. The electric power converter device of claim 1 wherein the power output device includes an isolated DC-to-DC converter, and the power output device is configured to electrically couple to the battery of the vehicle by way of a cable.

8. The electric power converter device of claim 1 wherein:
   the power factor converter includes a mode selection switch that is operable in a first mode or a second mode,
   in the first mode, the mode selection switch is driven by a first drive signal having a first duty cycle and the power factor converter outputs a first voltage level that is constant, and
   in the second mode, the mode selection switch is driven by a second drive signal having a second duty cycle that is greater than the first duty cycle and the power factor converter outputs a second voltage level that is dependent on a desired output voltage of the DC-to-DC converter and is greater than the first voltage level.

9. An electric power converter device for charging a battery in a vehicle, the electric power converter device comprising:
   an AC-to-DC power converter operable to convert alternating current from a power source to direct current DC power;
   a power factor converter PFC electrically coupled to the AC-to-DC power converter and configured to increase a voltage level of the DC power to a first voltage output;
   a DC-to-DC converter electrically coupled to the power factor converter and configured to decrease the DC power from the power factor converter from the first voltage output to a second voltage output;

a power output device configured to provide electrical power to the battery in the vehicle;

a bypass switch operable to electrically couple the power output device to one of the power factor converter or the DC-to-DC converter such that the electrical power outputted by the power output device is based on one of the first voltage output or the second voltage output; and a controller configured to control the electrical power supplied to the battery via the bypass switch, wherein the controller operates the bypass switch based on a current output voltage of the power factor converter and a desired DC-to-DC output voltage of the DC-to-DC converter and switches the bypass switch between a first state, whereby the bypass switch electrically couples the power output device to the DC-to-DC converter, and a second state, whereby the bypass switch electrically couples the power output device to the power factor converter.

10. The electric power converter device of claim 9 wherein:

the controller operates the bypass switch in the first state to electrically couple the DC-to-DC converter to the power output device when the current output voltage of the power factor converter is greater than the desired DC-to-DC output voltage, and the controller operates the bypass switch in the second state to electrically couple the power factor converter to the power output device when the current output voltage of the power factor converter is less than the desired DC-to-DC output voltage.

11. The electric power converter device of claim 9 wherein:

the power factor converter includes a mode selection switch operable by the controller based on the desired DC-to-DC output voltage and the current output voltage of the power factor converter, the controller operates the mode selection switch in a first mode when the current output voltage of the power factor converter is greater than the desired DC-to-DC output voltage, and the controller operates the mode selection switch is a second mode when the current output voltage of the power factor converter is less than the desired DC-to-DC output voltage.

12. The electric power converter device of claim 11 wherein:

in the first mode, the mode selection switch is driven by a first drive signal having a first duty cycle to have the power factor converter output a constant voltage level as the first voltage output, and in the second mode, the mode selection switch is driven by a second drive signal having a second duty cycle that is greater than the first duty cycle to have the power factor converter output a second voltage level, as the first voltage output, the second voltage level is dependent on the desired DC-to-DC output voltage of the DC-to-DC converter and greater than the constant voltage level.

13. The electric power converter device of claim 9 wherein:

the power factor converter includes a mode selection switch to control the first voltage output, the DC-to-DC converter includes a DCDC switch to control the second voltage output, the controller is configured to operate the mode selection switch in one of a first mode or a second mode based on the desired DC-to-DC output voltage of the DC-to-DC converter and the current output voltage of the power factor converter, the controller operates the bypass switch and the DCDC switch based on the current output voltage of power factor converter and the desired DC-to-DC output voltage, the controller operates the mode selection switch in the first mode, operates the bypass switch to electrically couple the DC-to-DC converter to the power output device, and operates the DCDC switch to output the second voltage output when the current output voltage of the power factor converter is greater than the desired DC-to-DC output voltage, and the controller operates the mode selection switch in the second mode and operates the bypass switch to electrically couple the power factor converter to the power output device when the current output voltage of the power factor converter is less than the desired DC-to-DC output voltage.

14. The electric power converter device of claim 9 wherein the power output device includes an isolated DC-to-DC converter, and the power output device is configured to electrically couple to the battery of the vehicle by way of a cable.

15. The electric power converter device of claim 9:

the power output device includes an inverter that is electrically coupled to a transmitting coil of a wireless power transfer system, the inverter supplies an alternating current that is based on the first voltage output of the power factor converter or the second voltage output of the DC-to-DC converter to the transmitting coil, and the transmitting coil induces a voltage in a receiving coil positioned in the vehicle in response to receiving the alternating current.

16. The electric power converter device of claim 9 wherein the controller determines the desired DC-to-DC output voltage based on at least one of a state of charge of the battery, a voltage level of the battery, and an electrical current output of the battery.

* * * * *

UNITED STATES PATENT AND TRADEMARK OFFICE
CERTIFICATE OF CORRECTION

PATENT NO. : 10,245,960 B2  
APPLICATION NO. : 15/072750  
DATED : April 2, 2019  
INVENTOR(S) : Kenji Ochi Page 1 of 1

It is certified that error appears in the above-identified patent and that said Letters Patent is hereby corrected as shown below:

On the Title Page

Column 1, item (72) Inventor, Line 1, Delete "Kariya" and insert --Kariya-city, Aichi-pref.-- therefor Signed and Sealed this  
Fourth Day of June, 2019

Andrei Iancu  
*Director of the United States Patent and Trademark Office*